United States Patent [19]

Reppel et al.

[11] Patent Number: 4,500,378

[45] Date of Patent: Feb. 19, 1985

[54] PROCESS AND AN APPARATUS FOR PRODUCING WOODEN COMPONENTS DESIGNED FOR RESISTING FLEXURAL LOADS

[75] Inventors: Werner Reppel, Gaggenau; Claus Overlack, Gernsbach, both of Fed. Rep. of Germany

[73] Assignee: Casimir Kast GmbH & Co. KG, Gernsbach, Fed. Rep. of Germany

[21] Appl. No.: 482,990

[22] Filed: Apr. 7, 1983

[30] Foreign Application Priority Data

May 14, 1982 [DE] Fed. Rep. of Germany ....... 3218134

[51] Int. Cl.[3] ....................... C09J 31/00; B32B 31/00; B26D 5/00

[52] U.S. Cl. .................................... 156/160; 156/163; 156/258; 156/353; 156/307.3; 156/307.7; 156/494; 52/223 R; 52/729; 144/353; 264/229; 264/231

[58] Field of Search ............... 156/160, 163, 258, 353, 156/494, 307.7, 307.3; 144/353; 264/229, 231; 52/729, 223 R

[56] References Cited

U.S. PATENT DOCUMENTS

| | | | |
|---|---|---|---|
| 2,574,920 | 11/1951 | Ilch | 156/494 |
| 3,000,429 | 9/1961 | Warnken | 156/494 |
| 3,783,066 | 1/1974 | Myers | 156/494 |
| 4,356,045 | 10/1982 | Elford et al. | 156/353 |
| 4,378,263 | 3/1983 | Logan | 156/163 |

FOREIGN PATENT DOCUMENTS

| | | | |
|---|---|---|---|
| 1921594 | 11/1970 | Fed. Rep. of Germany | 156/258 |
| 3036793 | 6/1982 | Fed. Rep. of Germany . | |

*Primary Examiner*—Edward Kimlin

*Attorney, Agent, or Firm*—Sandler & Greenblum

[57] ABSTRACT

In a process for producing wooden building components acted upon by flexural forces in the built-in condition, and made up of at least two members that are bonded together, the load capacity is increased by stressing at least one part of the component in the direction of its length by a linear force and is then bonded to another part of the component while still being acted upon by said force. In a preferred form of the invention at least one part of the component is acted upon by a pulling force and another part is acted upon by a compression force with a pre-stressing effect. The use of the process makes possible the production of bonded wooden structural members free of transverse forces.

6 Claims, 4 Drawing Figures

PROCESS AND AN APPARATUS FOR PRODUCING WOODEN COMPONENTS DESIGNED FOR RESISTING FLEXURAL LOADS

BACKGROUND OF THE INVENTION

The present invention is with respect to processes and forms of apparatus for producing wooden components that are loaded, when fitted in a building structure, flexurally and are made up of at least two bonded-together parts acted upon by a pre-stressing force.

DISCUSSION OF THE PRIOR ART

In the past the load capacity of wooden sections has been increased by bending them, and to take an example a solid section, that is to be used as a flexurally loaded beam, may be pre-bent in a direction opposite to that in the eventual load condition so that the beam has a certain degree of pre-stress that has to be taken up in the loaded condition before the load acting on the beam from the outside is responsible for causing a bending effect in the opposite direction.

This idea has been put to use in the art of making compound wooden bonded structures that are coming to be more and more used in building construction, as for example in the form of laminated board structures whose separate plies are pre-bent in a direction opposite to the direction of the future load. In this process, however, the properties under load of the overall cross section are hardly changed at all, seeing that the sum of the pre-stressing effects is the same in the separate plies over the cross section. A beam produced on these lines only has a certain degree of pre-bend or camber for stopping overgreat sagging in later use.

In another process as used in the production of compound bonded wooden structures, the cross section of a beam is made in three (for example) separate parts and the middle part is pre-bent in a direction opposite to the eventual load and then bonded to the two other outer parts. While it is true that in this case an inner moment is produced that is opposite to the moment of the load eventually acting on the beam, because of the special nature of the process used, crosswise forces come into being acting as restoring forces in the cross section of the compound structure. Such restoring forces have the same direction as the future load so that the thrust forces in the completed cross section are increased thereby. The resultant stress in the assembled condition is, it is true, decreased in the outer wood fibers to a value less than what it would be in a cross section that is not pre-bent, in the interfaces however, that is to say the bonds, the stress goes up to a further maximum value.

These known processes for increasing the load capacity of flexurally loaded beams of wood, which are in fact always undertaken on the construction site, have not come into general use to any degree at all.

SHORT OUTLINE OF THE INVENTION

It is for these reasons that one purpose of the invention is that of making a further development of a process of the sort noted that from the statics point of view makes it possible for the very best use to be made of a given cross section.

For effecting this and further purposes and objects of the invention that will become clear on further reading of the present account, for producing a component made up of at least two bonded-together parts, at least one part is pre-stressed with a linear force acting in the lengthways direction of the said part in a stressing bed and, while still acted upon by such force, is bonded to further parts of the component.

In the process in keeping with the present invention the component is in fact only acted upon by forces on the same lines as pre-stressed concrete acted upon by pre-stressing elements placed therein. Unlike the case of pre-stressed concrete, however, the material of the component itself is acted upon by a pre-stressing force right over its full cross section. The moment that may be so produced is specially large. At the same time the sum of the inner stresses produced by the pre-stressing is equal to zero so that all the stress reserves may be profited from for increasing the load capacity of the section and not for other purposes. It is because of the pre-stressing, that is to say the moment taking effect on the material of the beam, that after bonding the component has a bend, that is opposite in direction to the future bending or deformation of the component. For this reason there is not only the increase in the load capacity but furthermore the property of the structure to keep its form and dimensions better so that for a given sort of material, the cross section is better profited from than in the case of a prior process, that is to say, in other words, the cross section may be made smaller than in the known processes. Because only lengthways forces are used for pre-stressing, the cross section will be free of crosswise forces after bonding. For this reason the highest permissible thrust force may be used. In the case of a preferred form of the invention the one part of the component is pre-stressed with a tension force and the other is pre-stressed with a compression force so that the moment produced will have its highest possible value. The pre-stressing operation—undertaken in a pre-stressing bed—may be done in a joinery works so that the component may be sent to the building site as a prefabricated structure.

If the component is made up of three parts or more, as for example in form of an H-beam, the one outer part will be acted upon by the tension pre-stressing force and the other outer part will be acted upon by the compression pre-stressing force.

In the case of such a symmetrical cross section the compression and the tension pre-stressing forces will be generally caused to take effect symmetrically, but it goes without saying the an asymmetrical pre-stressing effect is possible. Such an asymmetrical effect may well be used for asymmetric cross sections.

A further step forward in the system of the invention is possible if the parts acted upon by the tension pre-stressing and the compression pre-stressing are made of different sorts of wood, the selection of such woods being in line with their strength properties.

It is furthermore possible for the parts acted upon by the pre-stressing effect and the parts not so acted upon to be made of different sorts of wood. Once again the selection of the woods may be in keeping with their strength properties so as to get the highest possible load capacity at the lowest price.

For undertaking the process of the invention one may make use of an apparatus having at least one stressing means for acting on the free ends of the part that is to be pre-stressed and a bonding stressing bed taking up all the parts of the component parallel to each other and having pressing faces, that may be moved towards the wood, running at least along the outer parts.

Together with other parts if desired or before them, the parts that are to be pre-stressed of the component are placed in the stressing bed and their free ends are joined up with the stressing means. After putting on the bonding material (this may be done before the parts are placed on the bed or while they are on it), the pressing faces are moved up to the outer parts of the component and moved till the force necessary for the bonding operation has been caused to take effect. While this is taking place the stressing means will be kept joined up. After the bonding material has cured, possibly under the effect of a high frequency field for speeding up the curing process, the pressing faces are let back and the stressing means taken off. The component will now become bent or deformed in a direction dependent on the pre-stressing forces that have acted upon it.

A preferred form of the apparatus of the invention is characterized by two stressing means for causing a tension and compression force to take effect on different parts of the component while it is in position in the bonding support bed. It is with this apparatus that oppositely acting pre-stressing forces may be caused to take effect on the component so that the same will have the highest possible load capacity.

Further details and useful effects of the invention will be seen from the account now to be given of a preferred working example thereof using the figures herein.

LIST OF DIFFERENT VIEWS OF THE FIGURES

DETAILED ACCOUNT OF WORKING EXAMPLES OF THE INVENTION

Figure 1:
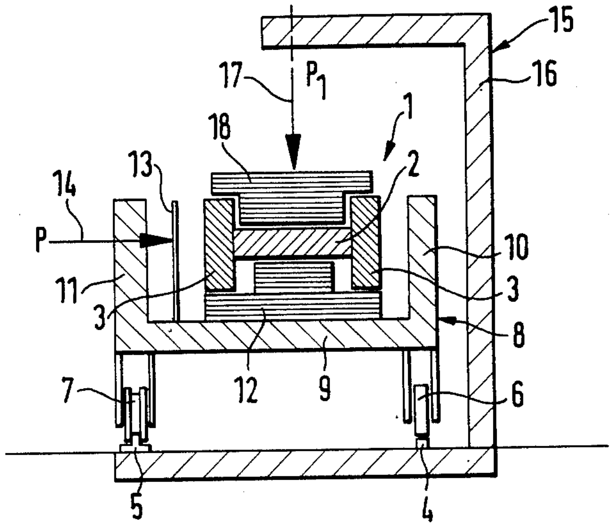
FIG. 1 is a cross section of one form of the apparatus.

In the working example of the invention to be seen in the figures it is a question of producing a pre-stressed and bonded I-girder 1. The girder 1 is made up of bar elements in the form of a web 2 and the two flanges 3 running along the two sides thereof.

The apparatus, that is of the same sort as detailed in the German Offenlegungsschrift specification No. 3,036,793 (that is designed for bonding only), firstly has a conveyor part in the form of a carriage 8 running by way of wheels 6 and 7 on rails 4 and 5 and which is used as a bonding support and stressing bed. In this respect at least one wheel 7 is in the form of a guide roller having for example two flanges for guiding the carriage 8 with as little play as possible, although in place of this it would naturally be possible to have rollers at the sides with horizontal axes of turning. The carriage 8 has a floor 9 and side support walls 10 and 11 placed opposite to each other and between which the elements of the girder 1 to be fabricated may be put. A jig 12 is placed on the floor 9 of the carriage 8 as a lower support for the girder 1, it having the same form as the downwardly turned face of the girder. One of the side support walls—in the present example the side wall 11—has a pressing unit, that in the figure has been marked in the form of a pressing face 13 with ram 14, acting like one jaw of a vice in the direction P. This takes effect on the left flange 3 of the girder 1, whereas the other support wall 10 is used as an opposite support for the flange 3, possibly with packing therebetween.

The apparatus further has a stationary pressing unit 15 made up of a number of spaced overhanging supports 16 each having an upright pressing ram dependent therefrom as marked diagrammatically at 17 for acting in the direction P1 by way of one or more bolsters 18 on the top side of the web 2 and of the flanges 3 in such a way as to give an even distribution of the pressing force on them. The bolsters 18 may as well be in the form of jigs matching the outline of the girder. With the pressing apparatus 15 the web 2 and the flanges 3 are pressed by way of the rams 17 against the lower jig 12 so that the elements of the girder are straightened and put fully into line with each other.

Figure 2:
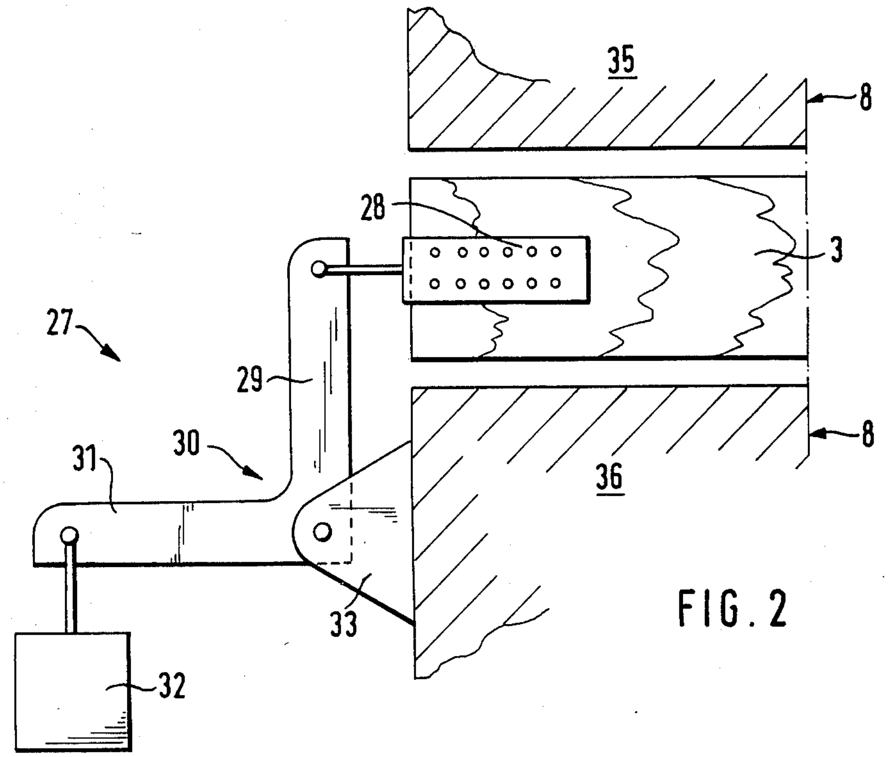
FIG. 2 is a side view thereof near one end of the apparatus with a stressing means.

At the end of the carriage 8, or more specially at both ends, there is a stressing unit 27 (see FIG. 2), that is fixed to the support bed, that is to say to the carriage 8, for example at the side wall 10 and 11 or on the floor 9 as well. The stressing unit 27 to be seen in FIG. 2 is designed for pre-stressing the work with a tension or pulling force, and to this end it has a pad 28 with gripping nails sticking out of it, or the like, which is fixed to the part to be stressed, that is to say in the present case, one of the flanges 3 of the girder 1. The nail pad 28 is pivoted to the one arm 29 of a bell crank 30 whose other arm 31 is loaded by a weight 32 for producing the pre-stressing force. The bell crank 30 is pivoted on a bracket 33. At the other end of the carriage 8 there is a further tensioning pre-stressing unit 27 or the flange 3 may simply be fixed in position at this point.

Figure 4:
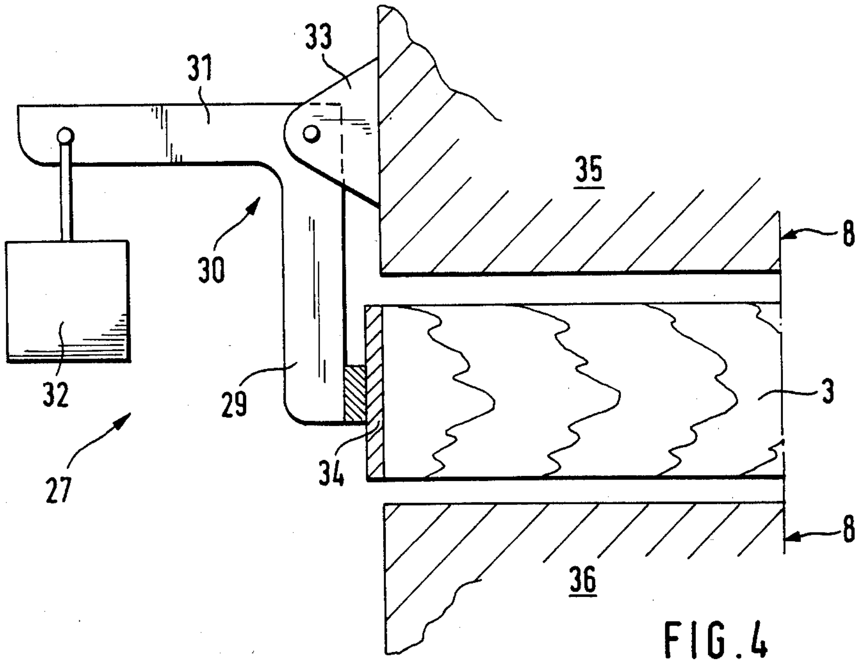
FIG. 4 is a view on generally the same lines as FIG. 2 of a further different form of the stressing means.

In the present working example the other flange 3 of the girder 1 is pre-stressed with a compression force. This force is produced by a stressing unit 27 as seen in FIG. 4, it only being different to the unit of FIG. 2 inasmuch as the pad with the nails has its place taken by a pressure jaw 34. At the other end of the stressing bed it is possible to have a stressing unit of the same sort or simply a back up support.

In the two views of FIGS. 2 and 4 the bonding stressing bed 8 and the stressing unit 27 are only marked diagrammatically in the form of the pads 35 and 36. The bed 8 is however designed as in FIG. 1. In place of the stressing unit 27 as in the figures, it is possible to have hydraulic rams, that would then have a pulling or pushing effect, as desired, on the flanges 3 of the girder 1.

Figure 3:
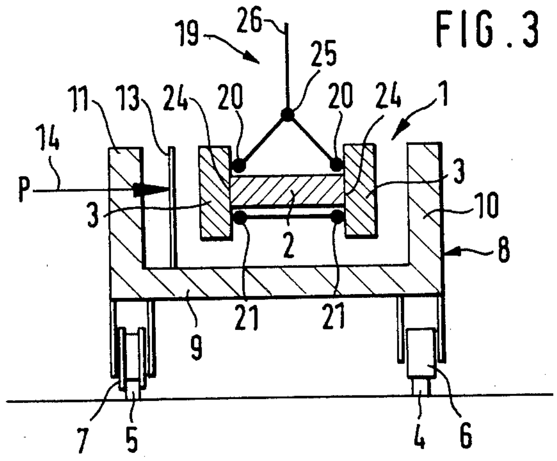
FIG. 3 is a cross section of a high frequency unit of the apparatus.

The parts 2 and 3 of the girder are, after putting on bonding adhesive material, placed in the bonding stressing bed in the way to be seen in FIG. 1 and the stressing unit 27 is joined up by way of the nail pad 28 or the pressure pads 34 as the case may be with the flanges 3 and the load 32 is caused to take effect. At the same time or later the pressing unit 15 is put into operation so that the parts 2 and 3 of the girder 1 are lined up in an upright direction and there is no chance of their being bent. Thereafter the pressing apparatus 13 and 14 is put into operation and the girder 1 is clamped in a sideways direction, the stressing force being about three times as great as the pressing force. After this the rams 17 are moved back into their starting positions, that is to say the carriage is freed by the pressing apparatus 16 so that the carriage may be run into the high-frequency apparatus to be seen in FIG. 3.

The high-frequency heating apparatus 19 has two upper electrodes 20 used as hot electrodes and two lower electrodes 21 used as cold electrodes, between which the girder 1 is moved through using the carriage 8. It is best for the electrodes to be acted upon by a spring force in a vertical and in a horizontal direction so that, using distance pieces of the right size, it is possible to make certain that the distance from the bond 24 (see FIG. 3) is the same all over. The pressing force may be kept even in a simple way by having the electrodes 20 seated by way of a joint 25 on a support 26 that for its part is acted upon by an upright spring. With such a design the position and angle of the electrodes 20 and 21 may be matched to different forms of girder.

We claim:

1. A process for producing a wooden structural component having at least a first part and a second part comprising the steps of:

(a) prestressing said first part of the component by a linear force acting in the longitudinal direction thereof, said linear force being a pulling force;

(b) loading said second part of the component with a compressive force; and (c) bonding said first part to said second part while said first part and said second part of the component are being acted upon by said pulling force and said compressive force to thereby flexually load said component.

2. The process as claimed in claim 1, wherein said component is made up of two outer parts, said outer parts being said first part and said second part, and one inner part wherein said first part is prestressed by a tensional force and said second part is prestressed by a compression force.

3. The process as claimed in claim 1 wherein said first part and said second part of the component are made of different sorts of wood.

4. The process as claimed in claim 1 wherein said component is made up of at least two parts, said parts including a first part and a second part, of which said first part is acted upon by said linear force while said second part is kept free of said force, said parts being made from different sorts of wood.

5. The process of claim 1 wherein at least one part of the component comprises a bar element which is prestressed over its full cross-section.

6. An apparatus for producing a wooden structural component using at least a first part and a second part that are bonded together, comprising:

(a) a bonding and supporting bed;

(b) a clamping means in communication with said bed for pressing said first part and said second part together in a transverse direction while said first part and said second part are parallel to each other;

(c) means associated with said bed for causing a linear pulling force to take effect on said first part; and (d) means associated with said bed for causing a compressive force to take effect on said second part of the component.

* * * * *